(12) United States Patent
Devaux et al.

(10) Patent No.: US 6,238,638 B1
(45) Date of Patent: May 29, 2001

(54) PROCESS FOR THE PREPARATION OF NITROSYL CHLORIDE

(75) Inventors: Jean-François Devaux, Jurancon; Bernard Monguillon, Bizanos, both of (FR)

(73) Assignee: Elf Atochem S.A., Puteaux (FR)

( * ) Notice: Subject to any disclaimer, the term of this patent is extended or adjusted under 35 U.S.C. 154(b) by 0 days.

(21) Appl. No.: 09/250,168

(22) Filed: Feb. 16, 1999

(30) Foreign Application Priority Data

Feb. 17, 1998 (FR) .................................................. 98 01995

(51) Int. Cl.$^7$ ................................................. C01B 21/084
(52) U.S. Cl. ............................................. 423/386; 423/472
(58) Field of Search ..................... 423/385, 386, 423/383, 467, 468, 472

(56) References Cited

U.S. PATENT DOCUMENTS

| | | | |
|---|---|---|---|
| 3,214,240 | 10/1965 | Beekhuis | 423/399 |
| 3,290,115 | * 12/1966 | Smai et al. | 423/386 |
| 3,336,110 | 8/1967 | Yoshikazu et al. | 423/386 |
| 3,338,887 | 8/1967 | Yoshikazu et al. | 423/386 |

FOREIGN PATENT DOCUMENTS

| | | |
|---|---|---|
| 626426 | 12/1962 | (BE) . |
| 1343113 | 10/1963 | (FR) . |
| 1556620 | * 2/1969 | (FR) ................................. 423/386 |
| 39-3406 | * 11/1961 | (JP) ................................. 423/386 |
| 43-028004 | 12/1968 | (JP) . |

OTHER PUBLICATIONS

French Search Rep0rt dated Oct. 9, 1998.
Chemical Abstracts, vol. 75, No. 4, Jul. 26, 1971, No. 23293, Itakina, D. Ya., et al., "Production of Nitrosyl Chloride".
Chemical Abstracts, vol. 71, No. 2, Jul. 14, 1969, No. 5017, Tanabe, Giichi et al., "Water Evaporation from Sulfuric Acid–Nitrosyl Sulfate–Water Mixed Solutions".
Grant & Hachk's "Chemical Dictionary", Fifth edition Q5 H3 pp. 563, 1987 (no month).*
CRC Handbook of Chemistry and Physics, 52$^{nd}$ edition, QD 65 C4 pp. D–192 to D–193, 1971 (no month).*

* cited by examiner

*Primary Examiner*—Ngoc-Yen Nguyen
(74) *Attorney, Agent, or Firm*—Smith, Gambrell & Russell, LLP

(57) ABSTRACT

The invention relates to a process for the preparation of nitrosyl chloride from a solution of nitrosylsulphuric acid in sulphuric acid and from hydrogen chloride, the said process being characterized in that the solution of nitrosylsulphuric acid is substantially free of water and that aqueous hydrochloric acid and gaseous hydrogen chloride are used in amounts such that the molar ratio of aqueous hydrochloric acid to nitrosylsulphuric acid is between 0.25 and 1.2 and the molar ratio of aqueous hydrochloric acid and of gaseous hydrogen chloride to nitrosylsulphuric acid is between 1.25 and 5.

7 Claims, No Drawings

PROCESS FOR THE PREPARATION OF NITROSYL CHLORIDE

FIELD OF THE INVENTION

The present invention relates to the preparation of nitrosyl chloride by reaction of a substantially water-free solution of nitrosylsulphuric acid in sulphuric acid, of gaseous hydrogen chloride and of aqueous hydrochloric acid.

BACKGROUND OF THE INVENTION

Nitrosyl chloride is a compound commonly used in chlorination, diazotization and nitrosation reactions of organic compounds.

In particular, it is employed in the industrial production of the oxime of cyclododecanone by photonitrosation of cyclododecane, which oxime is an intermediate in the synthesis of lauryllactam, which constitutes the base monomer for polyamide 12.

Various methods for the preparation of nitrosyl chloride are already known.

Mention may be made, among those which are suitable for industrial production, of:

- the process which consists in reacting nitric acid, nitrogen monoxide and hydrochloric acid or a metal chloride (see, for example, U.S. Pat. No. 3,214,240),
- the process which consists in reacting aqueous hydrochloric acid with gaseous nitrogen dioxide (see, for example, BE-B-626,426), and
- the process, in two stages, which consists in reacting a gaseous mixture of nitrogen monoxide and of nitrogen dioxide with sulphuric acid, so as to obtain a solution of nitrosylsulphuric acid in a mixture of sulphuric acid and water, and in then reacting this solution with gaseous hydrogen chloride at a temperature of 50 to 250° C. under conditions such that the water content of the solution is between 2 and 13% (see FR 1,343,113).

When the last process is employed, there may be an inducement to carry out the abovementioned stages on geographically separate industrial sites. It is then necessary to carry out operations of transportation and of storage of the nitrosylsulphuric acid solution while waiting for it to be employed in the following stage.

During these operations, disadvantages become apparent.

Solutions containing more than 40% of nitrosylsulphuric acid crystallize when the water content exceeds 10%. To overcome this disadvantage, it is then necessary either to reduce the content of nitrosylsulphuric acid, which is reflected by a decrease in the productivity, or to heat the solution to a temperature of the order of 50 to 100° C., which is expensive.

The presence of water causes, in the more or less long term, hydrolysis of the nitrosylsulphuric acid, which correspondingly decreases the yield of nitrosyl chloride. Hydrolysis becomes more significant as the temperature rises.

It has now been found that it is possible to overcome the abovementioned disadvantages, without significantly affecting the conversion to nitrosyl chloride, by reacting a substantially water-free solution of nitrosylsulphuric acid in sulphuric acid with gaseous hydrogen chloride and aqueous hydrochloric acid.

The subject-matter of the present invention is a process for the preparation of nitrosyl chloride from a solution of nitrosylsulphuric acid in sulphuric acid and from hydrogen chloride, the said process being characterized in that the solution of nitrosylsulphuric acid is substantially free of water and that aqueous hydrochloric acid and gaseous hydrogen chloride are used in amounts such that the molar ratio of aqueous hydrochloric acid to nitrosylsulphuric acid is between 0.25 and 1.2 and the molar ratio of aqueous hydrochloric acid and of gaseous hydrogen chloride to nitrosylsulphuric acid is between 1.25 and 5.

More particularly, the invention relates to such a process in which the molar ratio of aqueous hydrochloric acid to nitrosylsulphuric acid is between 0.27 and 1.1 and the molar ratio of aqueous hydrochloric acid and of gaseous hydrogen chloride to nitrosylsulphuric acid is between 1.4 and 5.

Better still, in the process according to the invention, the molar ratio of aqueous hydrochloric acid to nitrosylsulphuric acid is between 0.35 and 0.50 and the molar ratio of aqueous hydrochloric acid and of gaseous hydrogen chloride to nitrosylsulphuric acid is between 1.5 and 2.5.

The process will be better understood in the light of the description which follows.

The solution of nitrosylsulphuric acid in sulphuric acid generally comprises 40 to 73% by weight of nitrosylsulphuric acid and preferably 55% to 70% by weight. It can optionally comprise up to 3% by weight of sulphur trioxide and up to 2% by weight of water.

The solution of nitrosylsulphuric acid in sulphuric acid can be obtained, according to methods well known by the man skilled in the art, for example, by reaction of nitric acid and of sulphur dioxide, or by reaction of nitrogen monoxide, of nitrogen dioxide and of sulphuric acid (see, for example, FR 1,343,113), and preferably by reaction of nitrogen monoxide, of nitrogen dioxide and of oleum. It is also possible to replace the mixture of nitrogen monoxide and of nitrogen dioxide with nitrogen sesquioxide ($N_2O_3$).

The aqueous hydrogen chloride employed in the process according to the invention comprises 20 to 37% by weight of hydrogen chloride and preferably 30 to 37% by weight.

It is advantageous to add a, preferably inert, stripping gas to the gaseous hydrogen chloride, the aim of which is to improve the extraction of the nitrosyl chloride from the reaction mixture. Mention may be made, as example of such a gas, of nitrogen, argon, methane and mixtures of these gases.

The reaction temperature is generally between 10 and 200° C. and preferably 20 and 100° C.

The process according to the invention can be employed in any type of device known to a person skilled in the art, such as a reactor or a column for liquid/gas exchange, for example containing plates. Use is advantageously made of a plate column.

The process according to the invention can operate batchwise or continuously. Continuous operation is preferred.

The conversion of nitrosylsulphuric acid to nitrosyl chloride is at least equal to 97%, preferably 99% and better still 99.5%.

The nitrosyl chloride recovered in the gaseous mixture comprises a low nitrogen oxide content (less than 1000 ppm by weight).

The nitrosyl chloride can be used as is, that is to say as a mixture with the gaseous hydrogen chloride and, if appropriate, the stripping gas, or can be subjected to a purification stage, for example by cooling, so as to obtain the nitrosyl chloride in the liquid state, and low-temperature distillation.

The liquid effluent essentially comprises sulphuric acid in solution in water. The concentration of the acid, which varies according to the amount of aqueous hydrogen chloride employed, is generally between 60 and 90% by weight.

EXAMPLES

The examples which follow make it possible to illustrate the invention.

In these examples, the content of nitrosylsulphuric acid is measured according to the method which consists in operating by decoloration of a potassium permanganate solution.

The nitrosyl chloride yield with respect to the nitrosylsulphuric acid is measured by absorption, for a predetermined time, of the gas produced in sulphuric acid and quantitative determination of the solution obtained by decoloration of potassium permanganate.

Example 1

A 58.5% by weight solution of nitrosylsulphuric acid in sulphuric acid and a 31.4% by weight aqueous HCl solution are continuously introduced (221 ml/h, i.e. 1.99 mol/h, and 77 ml/h, i.e. 0.76 mol/h, respectively) at 23° C. at the top of a non-thermostatically-controlled glass column of Oldershaw type with a diameter equal to 35 mm comprising 10 plates and anhydrous HCl gas is injected (126 g/h, i.e. 3.45 mol/h) at the bottom of the column. The molar ratio of aqueous HCl to nitrosylsulphuric acid and of total HCl to nitrosylsulphuric acid is equal to 0.38 and 2.11 respectively. The gaseous effluent recovered at the top of the column is composed of nitrosyl chloride (61% by weight) and of HCl (39% by weight), the content of nitrogen oxides being less than 400 ppm by weight (measured by IR spectroscopy).

The nitrosyl chloride yield, calculated by the absorption of the effluent in sulphuric acid over a period of 30 minutes, is greater than 97%.

The liquid effluent continuously drawn off at the bottom of the column is essentially composed of 85% by weight sulphuric acid in water. The residual content of nitrosylsulphuric acid and of hydrochloric acid is equal to 2300 ppm by weight and 1500 ppm by weight respectively, which corresponds to a conversion of nitrosylsulphuric acid equal to 99.6%.

Example 2

The processing is carried out under the conditions of Example 1, modified in that, at the top of the column, the flow rate of the nitrosylsulphuric acid solution is equal to 219 ml/h (i.e. 1.97 mol/h) and the flow rate of the aqueous hydrochloric acid is equal 75 ml/h (i.e. 0.74 mol/h) and that, at the bottom of the column, a mixture of HCl gas (128 g/h, i.e. 3.5 mol/h) and of nitrogen (118 g/h) is injected.

The molar ratio of aqueous HCl to nitrosylsulphuric acid and of total HCl to nitrosyl sulphuric acid is equal to 0.38 and 2.15 respectively.

The gaseous effluent recovered is composed of nitrosyl chloride (39% by weight), of HCl (25% by weight) and of nitrogen (36% by weight).

The liquid effluent recovered comprises 900 ppm by weight of residual nitrosylsulphuric acid, which corresponds to a conversion equal to 99.8%.

Example 3

The processing is carried out under the conditions of Example 1, modified in that, at the top of the column, the flow rate of the nitrosylsulphuric acid solution is equal to 236 ml/h (i.e. 2.13 mol/h) and the flow rate of the aqueous hydrochloric acid is equal to 59 ml/h (i.e. 0.58 mol/h) and that, at the bottom of the column, the HCl gas is injected at the rate of 146 g/h (i.e. 4.0 mol/h).

The molar ratio of aqueous HCl to nitrosylsulphuric acid and of total HCl to nitrosylsulphuric acid is equal to 0.27 and 2.15 respectively.

The liquid effluent recovered comprises 1.8% by weight of residual nitrosylsulphuric acid, which corresponds to a conversion equal to 97.0%.

Example 4 (Comparative)

The processing is carried out under the conditions of Example 1, modified in that, at the top of the column, the flow rate of nitrosylsulphuric acid is equal to 230 ml/h (i.e. 2.08 mol/h) and that the processing is carried out without introduction of the aqueous HCl solution and that, at the bottom of the column, the HCl gas is injected at the rate of 166 g/h (i.e. 4.5 mol/h).

The molar ratio of total HCl to nitrosylsulphuric acid is equal to 2.17.

The liquid effluent recovered comprises 24.7% by weight of residual nitrosylsulphuric acid, which corresponds to a conversion equal to 55.0%.

Example 5 (Comparative)

The processing is carried out under the conditions of Example 1, modified in that:
the column is maintained at 40° C.,
at the top of the column,
a solution containing 42.2% by weight of nitrosylsulphuric acid, 49.8% by weight of sulphuric acid and 8% by weight of water is introduced (232 ml/h, i.e. 1.43 mol/h of nitrosylsulphuric acid),
the aqueous HCl solution is no longer added
at the bottom of the column
the HCl gas is injected at the rate of 118 g/h, i.e. 3.2 mol/h.

The molar ratio of total HCl to nitrosylsulphuric acid is equal to 2.25.

The liquid effluent recovered comprises 6.2% by weight of residual nitrosylsulphuric acid, which corresponds to a conversion equal to 86.5%.

Example 6 (Comparative)

The processing is carried out under the conditions of Example 5, modified in that, at the top of the column, a solution containing 41.5% by weight of nitrosylsulphuric acid, 47.5% by weight of sulphuric acid and 11% by weight of water is introduced (234 ml/h, i.e. 1.38 mol/h of nitrosylsulphuric acid) and that, at the bottom of the column, the HCl gas is injected at the rate of 110 g/h (i.e. 3.0 mol/h).

The molar ratio of total HCl to nitrosylsulphuric acid is equal to 2.18.

The liquid effluent recovered comprises 0.78% by weight of residual nitrosylsulphuric acid, which corresponds to a conversion equal to 98.3%.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A process for the preparation of nitrosyl chloride from a solution of nitrosylsulphuric acid in sulphuric acid and from hydrogen chloride, the said process comprising:

preparing the nitrosyl chloride by a continuous process in a device that is a reactor or a column wherein a) said solution of nitrosylsulphuric acid in sulphuric acid is substantially free of water,
b) said solution of nitrosylsulphuric acid in sulphuric acid is fed into the top of the device,
c) aqueous hydrochloric acid is fed into the top of the device,
d) gaseous hydrogen chloride is fed into the bottom of the device, and
e) said aqueous hydrochloric acid and said gaseous hydrogen chloride are used in amounts such that the molar ratio of aqueous hydrochloric acid to nitrosylsulphuric acid is between 0.25 and 1.2, and the molar ratio of aqueous hydrochloric acid and of gaseous hydrogen chloride to nitrosylsulphuric acid is between 1.25 and 5.

2. The process according to claim 1, wherein the molar ratio of aqueous hydrochloric acid to nitrosylsulphuric acid is between 0.27 and 1.1 and the molar ratio of aqueous hydrochloric acid and of gaseous hydrogen chloride to anhydrous nitrosylsulphuric acid is between 1.4 and 5.

3. The process according to claim 1, wherein the molar ratio of aqueous hydrochloric acid to nitrosylsulphuric acid is between 0.35 and 0.50 and the molar ratio of aqueous hydrochloric acid and of gaseous hydrogen chloride to nitrosylsulphuric acid is between 1.5 and 2.5.

4. The process according to claim 1, wherein the aqueous hydrochloric acid comprises 20 to 37% by weight of hydrogen chloride.

5. The process according to claim 1, wherein the solution of nitrosylsulphuric acid in sulphuric acid comprises 40 to 73% by weight of nitrosylsulphuric acid.

6. The process according to claim 5, wherein the solution of nitrosylsulphuric acid in sulphuric acid comprises 55 to 70% by weight of nitrosylsulphuric acid.

7. The process according to claim 1, wherein the device is a plate column.

* * * * *